US008040775B2

(12) United States Patent  
Ikeda et al.

(10) Patent No.: US 8,040,775 B2  
(45) Date of Patent: Oct. 18, 2011

(54) OPTICAL DISC APPARATUS AND OPTICAL DISC DISCRIMINATING METHOD

(75) Inventors: Takeshi Ikeda, Tokyo (JP); Hidetomo Komaki, Tokyo (JP); Keitaro Mizoe, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 261 days.

(21) Appl. No.: 12/337,659

(22) Filed: Dec. 18, 2008

(65) Prior Publication Data

US 2009/0161515 A1 Jun. 25, 2009

(30) Foreign Application Priority Data

Dec. 20, 2007 (JP) ................................. 2007-328417

(51) Int. Cl.
*G11B 7/00* (2006.01)
(52) U.S. Cl. ...................................... 369/53.23; 369/94
(58) Field of Classification Search ........................ None
See application file for complete search history.

(56) References Cited

U.S. PATENT DOCUMENTS

| 6,320,840 | B1 | 11/2001 | Oh et al. |
| 6,501,712 | B1 | 12/2002 | Masuda et al. |
| 2001/0017348 | A1 | 8/2001 | Ishihara |
| 2003/0231565 | A1* | 12/2003 | Kuwayama ................ 369/44.29 |
| 2004/0224041 | A1 | 11/2004 | Morishima |

FOREIGN PATENT DOCUMENTS

| CN | 1263629 | 8/2000 |
| JP | 10-261258 | 9/1998 |
| JP | 11-086338 | 3/1999 |
| JP | 2001-243696 | 9/2001 |
| JP | 2004-206845 | 7/2004 |
| JP | 2007-226869 | 9/2007 |

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

An optical disc apparatus capable of discriminating swiftly and accurately a dual disc from other discs and an optical disc discriminating method, wherein the optical disc apparatus irradiates laser beams having a different wavelength onto the optical disc, detects the reflected light obtained by the irradiation of the laser beams having the individual wavelengths, determines amplitude of an error signal according to the detected results of the individual reflected lights, and discriminates the optical disc based on a ratio of amplitudes of the individual reflected lights.

3 Claims, 8 Drawing Sheets

OPTICAL DISC APPARATUS AND OPTICAL DISC DISCRIMINATING METHOD

INCORPORATION BY REFERENCE

The present application claims priority from Japanese application JP 2007-328417 filed on Dec. 20, 2007, the entire content of which is hereby incorporated by reference into this application.

BACKGROUND OF THE INVENTION

The present invention relates to an information reproducing/recording apparatus having compatibility for recording and reproducing different types of optical discs, and an optical disc discriminating method.

In recent years, standards for HDDVD and Blu-ray disc (BD) using a 405 nm wavelength blue-violet laser for reading/recording with a storage capacity improved substantially in comparison with DVD have been added to the conventional CD and DVD standards.

Besides, there are also standards for a dual disc (also called "hybrid disc") having both characteristics of different standards of CD and DVD and for a LabelFlash disc having a discoloration layer, which is discolored by heat or light, formed integrally on a side of a substrate opposite to a recording layer to enable to form a labeling surface on the side opposite to the recording layer by emitting a laser beam to the discoloration layer.

Accordingly, an information reproducing/recording apparatus having compatibility with recording or reproducing of different types of optical discs needs to discriminate a type of optical disc at the time of recording on an optical disc or reproducing the optical disc.

For example, Japanese Patent Laid-Open No. 11-86338 describes a discriminating method of a hybrid disc in a reproducing apparatus for an optical disc which has discrimination information about a disc type recorded in a designated recording region, comprising a step of irradiating a CD laser beam onto the optical disc set on a DVD reproducing apparatus, a step of checking whether the discrimination information is recorded in the designated recording region when data is read from the optical disc, and a step of recognizing the optical disc as a hybrid disc when the discrimination information is recorded in the designated recording region.

Japanese Patent Laid-Open No. 2007-226869 describes an optical disc apparatus that an optical pickup is vertically moved to detect a focus error signal, a focus drive height h is detected at a position where a focus error signal becomes maximum from a time when the focus error signal has exceeded a particular level to a next time when the focus error signal exceeds a particular level, and when a disc having two or more layers is set, it is discriminated with high precision what disc is the set optical disc according to a distance d between the plural focus drive heights detected by the above method, thereby wasteful start processing is eliminated.

Japanese Patent Laid-Open No. 2004-206845 describes an optical disc apparatus which discriminates a label surface to which an optical pickup is faced according to a waveform of a focus error signal which appears at the time of focus search prior to the focus control.

SUMMARY OF THE INVENTION

The optical disc apparatus described in Japanese Patent Laid-Open No. 11-86338 has a disadvantage that discrimination cannot be conducted swiftly because the hybrid disc is discriminated according to the discrimination information recorded on the optical disc.

The optical disc apparatus described in Japanese Patent Laid-Open No. 2007-226869 needs to recognize a surface position of the optical disc in order to detect the focus drive height h at a position where the focus error signal becomes maximum, so that it must be configured to position the optical mechanism away from the optical disc, thereby enabling to focus on the surface of the optical disc.

But, for example, a 9.5 mm thick slim drive has a disadvantage that the disc cannot be discriminated accurately because a stroke that the optical mechanism can be moved is inevitably restricted and the distance d between the plural focus drive heights cannot be obtained accurately.

According to the standard for a dual disc having a form that a DVD and a CD are mutually bonded with a label layer between them, a user can use the dual disc as a DVD or a CD by changing the direction of placing the optical disc in an optical disc apparatus.

A conventional optical disc apparatus judges a CD surface of a dual disc as an ordinary CD and reproduces or records the optical disc under the same conditions without discriminating them.

The thickness of the CD layer in the dual disc is set to 0.9 mm which is different from that (1.2 mm) of the ordinary CD, so that the position of the CD recording surface is different.

Therefore, in order to improve reproduction quality of data or recording quality of data of the CD surface of the dual disc, it is necessary to optimize the processing conditions of the optical disc apparatus independent of the ordinary CD. The above-described publication has not clarified that the optical disc apparatus discriminates between the CD surface of the dual disc and the ordinary CD.

Japanese Patent Laid-Open No. 2004-206845 does not describe discrimination of the dual disc.

Under the circumstances described above, the present invention provides an optical disc apparatus capable of discriminating swiftly and accurately a dual disc from another disc, and an optical disc discriminating method.

The present invention also provides an optical disc apparatus and an optical disc discriminating method capable of discriminating accurately the dual disc from another disc even in a slim drive that a movable stroke of an optical mechanism is restricted.

The present invention also provides an optical disc apparatus and an optical disc discriminating method capable of distinguishing the CD surface of the dual disc from an ordinary CD.

The present invention also provides an optical disc apparatus and an optical disc discriminating method capable of distinguishing between a dual disc and a LabelFlash disc.

To achieve the objects, the present invention provides an optical disc apparatus which irradiates laser beams having different wavelength to an optical disc, detects the reflected lights obtained by the irradiation of the laser beams having respective wavelength, determines the amplitude of an error signal from the detected results of the respective reflected lights, and discriminates the optical disc according to a ratio of the amplitudes of the reflected lights.

The present invention can provide an optical disc apparatus and an optical disc discriminating method capable of discriminating swiftly and accurately a dual disc from other discs.

The present invention can also provide an optical disc apparatus and an optical disc discriminating method capable of discriminating accurately a dual disc from other discs even for a slim drive in which a movable stroke of an optical mechanism is restricted.

The present invention can also provide an optical disc apparatus and an optical disc discriminating method capable of discriminating a CD surface of a dual disc from an ordinary CD.

The present invention can also provide an optical disc apparatus and an optical disc discriminating method capable of distinguishing between a dual disc and a LabelFlash disc.

These and other features, objects and advantages of the present invention will become more apparent from the following description when taken in conjunction with the accompanying drawings.

DETAILED DESCRIPTION OF EMBODIMENTS

Figure 1:
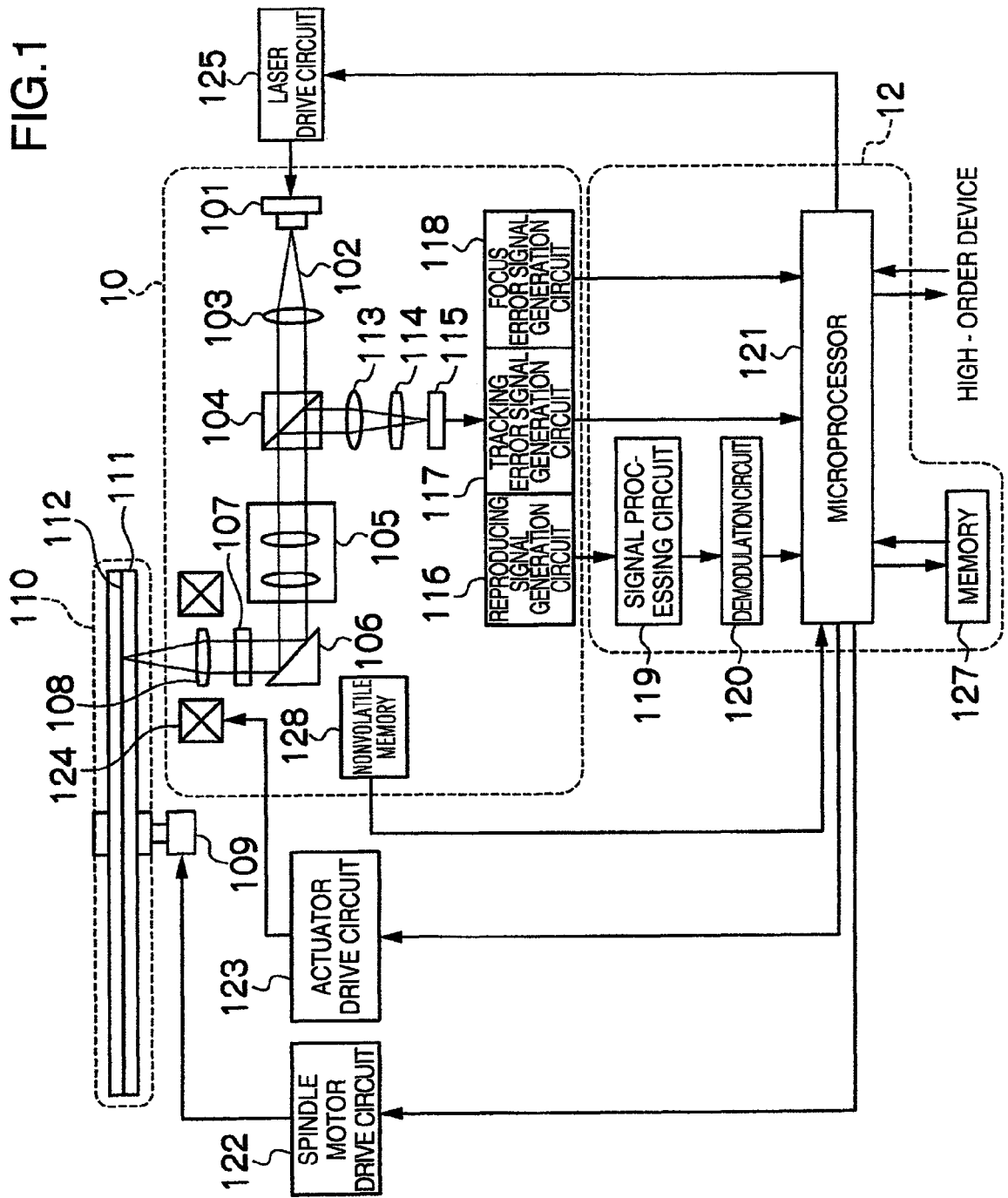
FIG. 1 is a block diagram illustrating a construction of an embodiment of the optical disc apparatus of the present invention.

Embodiments of the present invention are described below with reference to the drawings. FIG. 1 is a block diagram of the optical disc apparatus according to the present invention. The optical disc apparatus is mainly comprised of an optical pickup 10 and a signal processing means 12.

A laser diode 101 outputs a linearly-polarized laser beam 102, which is transformed into a parallel light flux by a collimator lens 103. The laser beam 102 passes through a polarization beam splitter 104. The polarization beam splitter 104 allows to pass through the laser beam 102 outputted from the laser diode 101 without a loss.

The laser beam 102 having passed through the polarization beam splitter 104 is provided with a prescribed spherical aberration by a spherical aberration correction element 105 and reflected by a rising mirror 106 to change its course to a direction of an optical disc medium 110 which is driven to rotate by a spindle motor 109.

The laser diode 101 is comprised of two laser generation means which output a CD laser (infrared: wavelength 780 nm) and a DVD laser (red: wavelength 650 nm) or a total of three laser generation means which additionally output a laser beam for HDDVD or BD (blue-violet: wavelength 405 nm).

The laser beam 102 passes through a λ/4 plate 107 and its polarized state is transformed from a linearly-polarized beam to a circularly-polarized beam. The laser beam 102 is converged by an objective lens 108 and reached an information recording surface 112 by passing through a cover layer 111 which protects the information recording surface to form a light spot on the information recording surface 112.

Information is recorded by irradiating the laser beam modulated according to data onto the information recording surface by converging and changing the information recording surface state by heat generated by the formed light spot. Meanwhile, the information is reproduced by detecting a change of reflectance caused by a change in the information recording surface state.

A reproduction-only optical disc has pits which are previously formed in the information recording surface by a disc manufacturing process, and the information is reproduced by detecting a change in optical reflectance due to the pits.

The laser beam 102 reflected on the information recording surface passes through the objective lens 108 and then the λ/4 plate 107 to return to a linear polarized light, which is reflected on the rising mirror 106 to travel in the direction of the polarization beam splitter 104.

The laser beam 102 is reflected by the subsequent polarization beam splitter 104 to change its course at right angles. The laser beam 102 is focused onto a photodetector 115 by a detection lens 113 and a cylindrical lens 114 for detecting an error signal.

Figure 2:
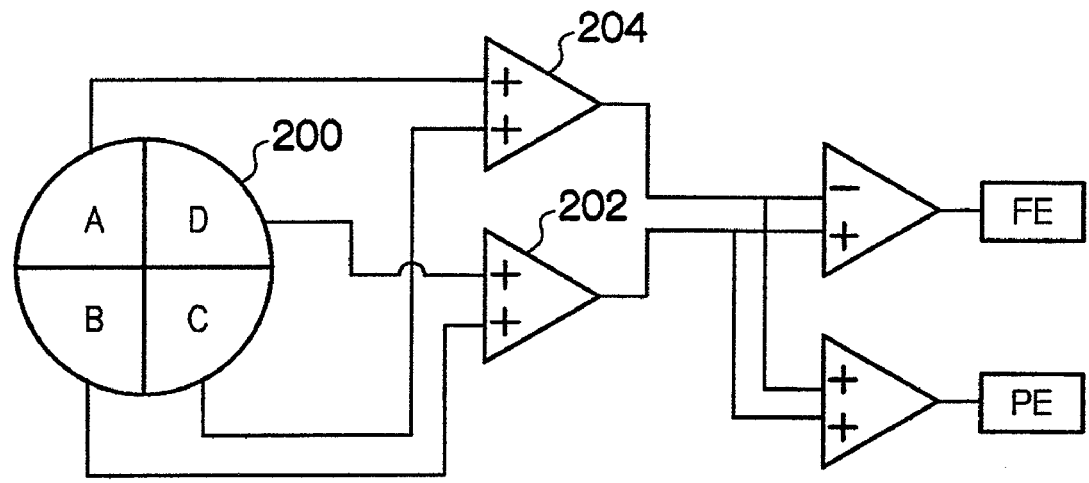
FIG. 2 is a block diagram showing a detailed structure of a circuit which generates a focus error signal (FE) and a pull-in error signal (PE)

As shown in FIG. 2, a detection surface 200 of the photodetector 115 is divided into four in total, namely two in a radial direction of the disc and also two in the track direction. The individual divided detection portions A, B, C and D produce output signals $I_A$, $I_B$, $I_C$ and $I_D$.

These output signals are used to generate reproducing signals by a reproducing signal generation circuit 116. And, a focus error signal FE $((I_B+I_D)-(I_A+I_C))$ is generated by a focus error (FE) signal generation circuit 118. A PE (pull-in error) signal $(I_A+I_B+I_C+I_D)$ is also generated by the reproducing signal generation circuit 116.

A focus error signal is generated by the displacement of the light spot with respect to the information recording surface 112 in the direction of the axis of rotation of the disc and used to drive the focus actuator for a focus servo to cause the light spot to follow the information recording surface 112.

When the cylindrical lens 114 operates to focus on the recording surface of the optical disc, its reflected light image becomes round on the four-split light-receiving surface of the photodetector. Then, a differential output $((I_B+I_D)-(I_A+I_C))$ of the focus error signal between the light-receiving surfaces in a diagonal direction becomes zero, and the lens comes into focus.

Figure 4:
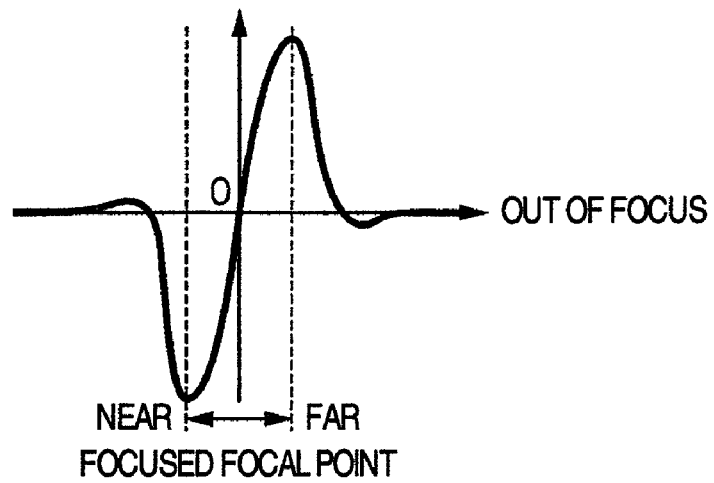
FIG. 4 is a waveform diagram of a focus error signal.

When the recording surface of the disc becomes close to or far from a focal position of the objective lens, the image on the four-split light-receiving surface changes from a circle to an oval, and the focusing error signal becomes a positive (far) or negative (close) electric signal (voltage). FIG. 4 is a waveform diagram showing the focus error signal. A voltage of a focus error signal changes in proportion to defocusing. The focus actuator adjusts the position of the objective lens against the disc in an optical axis direction to focus on the disc such that an error voltage becomes zero in the changing process shown in FIG. 4.

A tracking error signal generation circuit 117 performs a phase comparison of $(I_A+I_C)$ and $(I_B+I_D)$ to generate a tracking error signal. The tracking error signal is a signal which is generated due to displacement of the light spot in the disc radial direction with respect to the track and used for a tracking servo to cause the light spot to follow the track.

Figure 3:
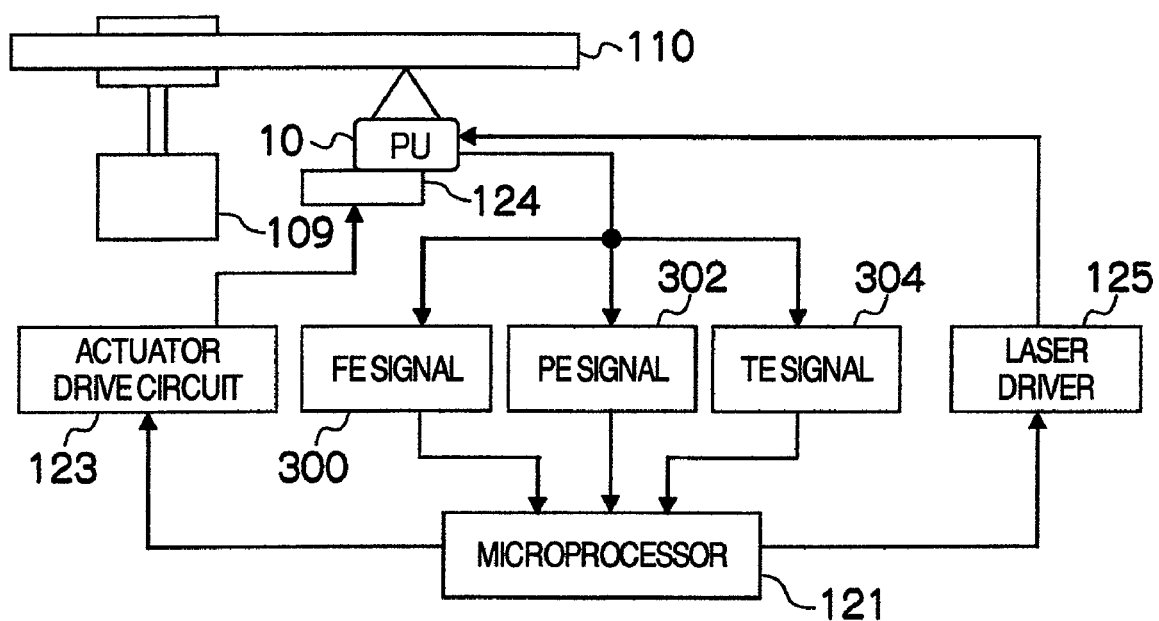
FIG. 3 is a block diagram showing a detailed structure of signal processing means of an optical disc apparatus.

As shown in FIG. 3, a microprocessor 121 sends an instruction to an actuator drive circuit 123 according to a received tracking error signal (TE signal) 304, the actuator drive circuit 123 controls an actuator 124 according to the instruction to position the objective lens 108 by driving it in a disc radial direction.

The microprocessor 121 sends an instruction to the actuator drive circuit 123 according to a received focus error signal (FE signal) 300, and the actuator drive circuit 123 controls the actuator 124 according to the instruction to position the objective lens 108 by driving it in the direction of the axis of rotation of the disc.

The actuator is a mechanism which moves the objective lens 108 with high speed and high accuracy in a biaxial direction by an electromagnetic force generated by a moving coil type motor to constantly align the light spot on a recording mark on the optical disc. Focusing by the actuator moves the light spot of the laser beam in an optical axis direction, and its tracking moves the light spot of the laser beam in a direction orthogonal to the optical axis.

The reproducing signal is a data signal which is undergone signal processing such as waveform equalization processing by a signal processing circuit 119 and converted to a binary signal by a demodulation circuit 120. The binary signal is converted to data by the microprocessor 121 and sent to a high-order device.

The microprocessor 121 controls a spindle motor drive circuit 122 to reproduce data at a prescribed speed and controls the number of rotations of the spindle motor 109.

To record data on an optical disc, the data received from the high-order device is encoded by the microprocessor 121 to generate a recording signal. The recording signal is sent to a laser drive circuit 125, and the laser diode 101 is driven according to the recording signal.

Figure 5:
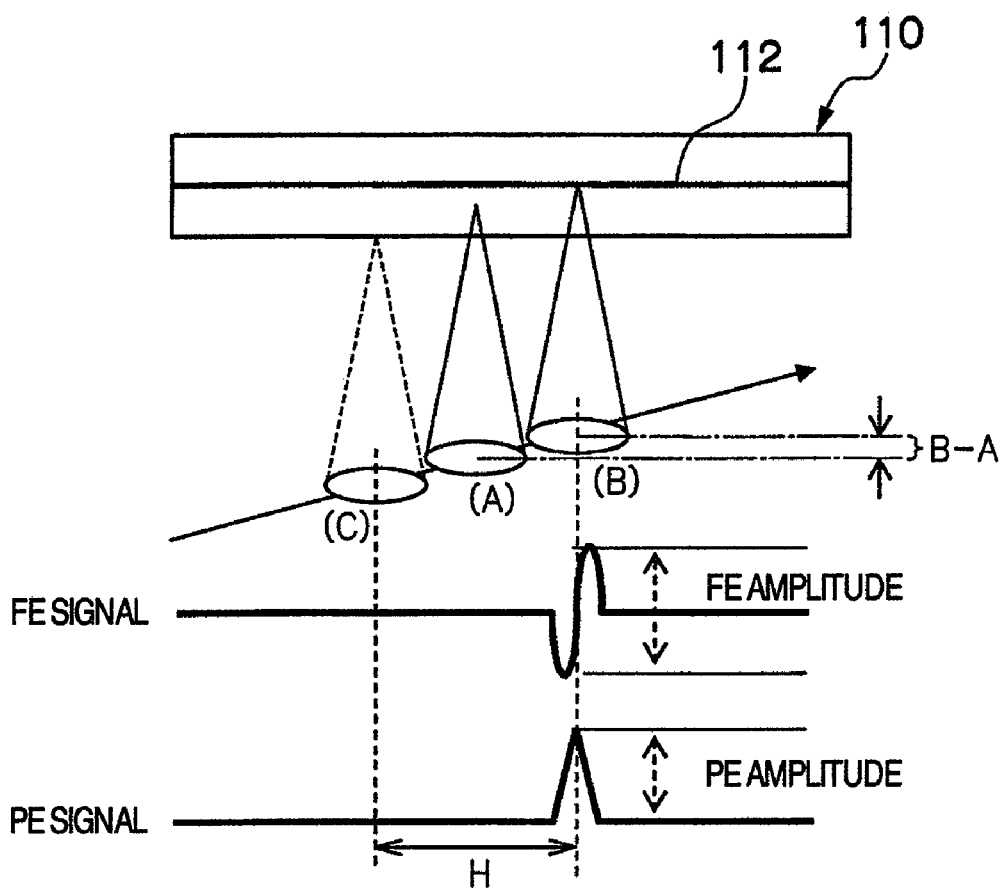
FIG. 5 is a characteristic graph showing a relationship between focusing of an objective lens and a focus error signal and a pull-in error signal.

When the optical disc apparatus is to discriminate a disc, the microprocessor 121 sends an instruction to the actuator drive circuit 123 in a state that the laser beam is irradiated from the laser diode 101 to the optical disc to drive the focus actuator 124 and continuously moves the objective lens 108 in the direction of the axis of rotation of the disc from a position (A) to a position (B) at a fixed speed as shown in FIG. 5. The focus actuator 124 can cause the objective lens 108 to focus the laser beam on the information recording surface 112 at the position (B).

In the process, the focus error signal changing as shown in FIG. 4 is generated by the focus error signal generation circuit 118. The microprocessor 121 constantly monitors the focus error signal and stores in a memory 127 a voltage corresponding to the maximum amplitude (FE amplitude) of a focus error signal which is generated around the time when the focal position of the objective lens is set on the recording surface of the disc.

The PE signal also has maximum amplitude around the time when the focal position of the objective lens is set on the recording surface of the optical disc. The microprocessor stores in the memory 127 a voltage corresponding to the maximum amplitude (PE amplitude) of the PE signal.

Since the present invention is different from Japanese Patent Laid-Open No. 2007-226869 and does not adopt a difference (H) of the focus drive height when the focus error signal becomes maximum for discrimination of the optical disc, it is not necessary to consider the amplitude of the focus error signal of the reflected light from the disc surface with the objective lens arranged to focus on the disc surface.

Therefore, since it is adequate for the focus actuator to move the objective lens not from a position (C) where the laser beam can be focused on the surface of the optical disc 110 but from the position (A), where the objective lens is closer to the optical disc 110, to the position (B), the stroke of moving the objective lens can be limited to the range of (B-A).

As described below in further detail, the present invention can surely discriminate the optical disc even in a slim drive where the movable range of the objective lens is limited.

An optical disc apparatus according to an embodiment of the present invention discriminates an optical disc by measuring amplitude (FE1) of the focus error signal of the reflected light obtained by irradiating the DVD laser to the information recording surface of the optical disc, amplitude (PE1) of the pull-in error signal of the reflected light obtained by irradiating the DVD laser to the information recording surface of the optical disc, amplitude (FE2) of the focus error signal of the reflected light obtained by irradiating the CD laser to the information recording surface of the optical disc, and amplitude (PE2) of the pull-in error signal of the reflected light obtained by irradiating the CD laser to the information recording surface of the optical disc, and conducting a specific calculation of their values.

The inventor has made various studies about an index for discrimination of an optical disc to obtain a finding that the optical disc can be discriminated accurately based on a ratio of the plural amplitudes.

In other words, when $((FE1)/(FE2))^{*1}$ which is a ratio of FE1 and FE2 is larger than a first specific threshold value, the target disc can be discriminated as a DVD, and when it is not larger than the first specific threshold value, the target disc can be discriminated as other than the DVD. Hereinafter, *1 is called "first index".

When $[((FE2)/(FE1))*((PE2)/(PE1))]^{*2}$ which is a product of (ratio between FE2 and FE1) by (ratio between PE2 and PE1) is larger than a second specific threshold value, the target disc can be discriminated to be a CD, and when it is not larger than the second specific threshold value, the target disc can be discriminated to be other than a CD. Hereinafter, *2 is called "second index".

Besides, when ((PE1)/(FE1)) which is a ratio between PE1 and FE1 is larger than a third specific threshold value, the target disc can be discriminated to be a CD surface of a dual disc having a CD recording surface and a DVD recording surface, and when the value is not larger than the third specific threshold value, the target disc can be discriminated to be a label surface of a LabelFlash disc. Hereinafter, *3 is called "third index".

Therefore, the methods of discriminating the target disc according to the above indexes can be combined to discriminate plural types of discs including the dual disc and the LabelFlash disc from one another.

Figure 6:
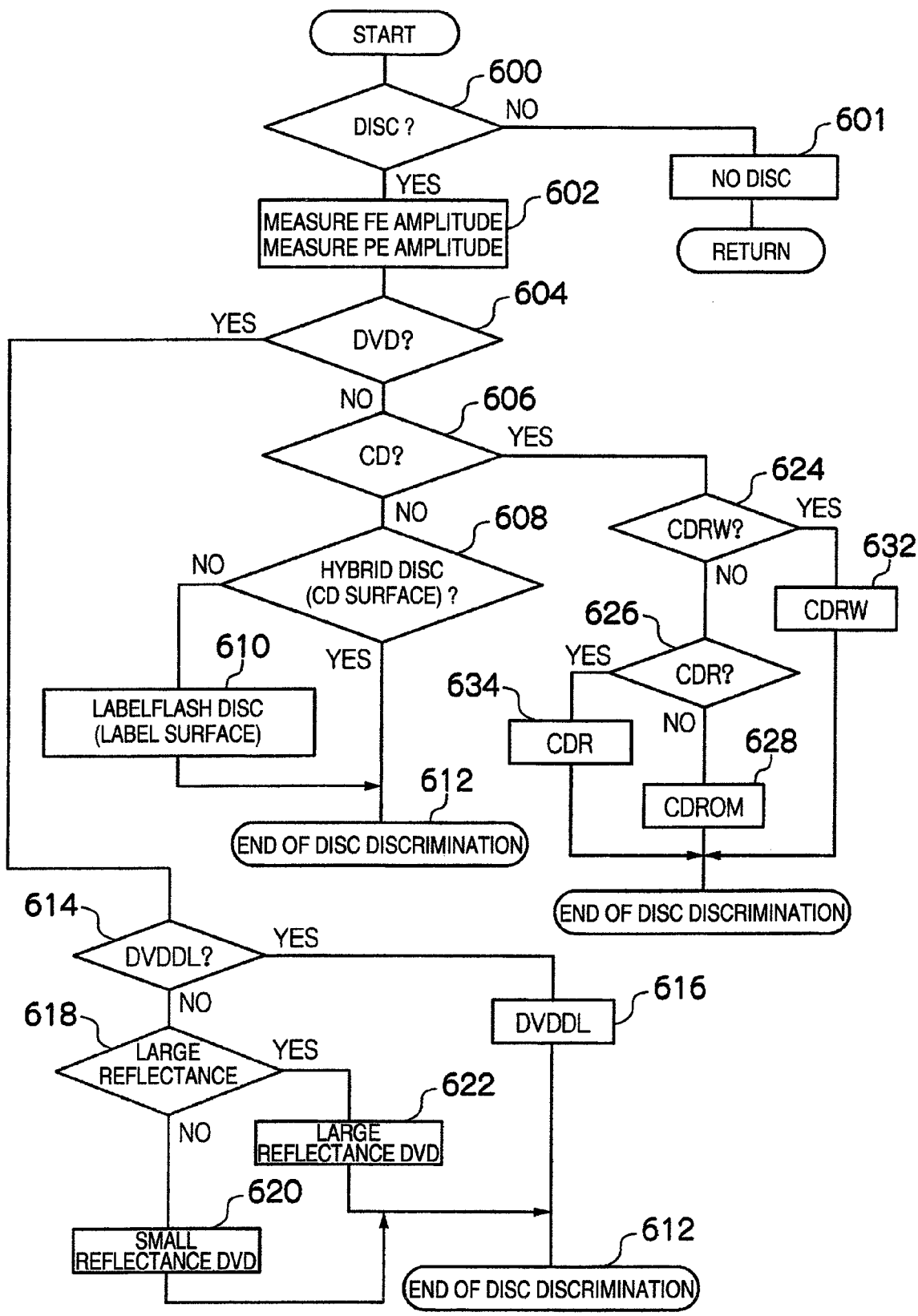
FIG. 6 is a flow chart of optical disc discrimination processing of an optical disc apparatus.

FIG. 6 is a flow chart showing an operation of discriminating the target disc by an optical disc apparatus. The flow chart is described based on the assumption that the target disc is any of various types of DVDs, various types of CDs, dual discs and LabelFlash discs, and the optical disc apparatus can discriminate these optical discs from one another.

First, the microcomputer 121 irradiates a laser beam having a prescribed wavelength such as a CD laser beam or a DVD laser beam to the optical disc 110, detects a pull-in error signal of the reflected light and judges the presence or not of a disc (600). If the pull-in error signal does not have a prescribed level or higher output, it is judged that there is no optical disc (601).

The microcomputer irradiates the CD laser beam and the DVD laser beam to the optical disc and determines the above-described FE1, FE2, PE1 and PE2 which are amplitudes of error signals from the individual reflected lights (602).

The microcomputer performs a calculation of the above-described first index and compares the calculated results with the first threshold value to judge whether the target disc is a DVD or another disc (604). The above-described individual threshold values are stored as a table for each index in a memory 127.

When it is judged by the microcomputer that the target disc is not a DVD, the microcomputer performs a calculation of the second index and judges whether the target disc is a CD or another disc (606).

When the microcomputer judges that the target disc is not a DVD or a CD, the target disc is a CD surface of the dual disc or a label surface of the LabelFlash disc, so that the microcomputer performs a calculation on the third index to judge whether the target disc is a dual disc or not (608).

When the judgment is confirmed, the target disc is finally discriminated as a dual disc, and the disc discrimination processing is terminated (612). Meanwhile, when the judgment made in the step 608 is denied, the target disc is finally discriminated as a LabelFlash disc (610), and the disc discrimination processing is terminated (612).

After judging the target disc as the DVD, the microcomputer uses the amplitude (FE1) of the focus error signal to distinguish whether it is a dual-layer disc (DVDDL) or a single-layer disc (614). When the target disc is a dual-layer disc, the distinguishing becomes possible because the amplitude of the focus error signal appears twice at the time of focusing.

When it is finally discriminated that the target disc is the dual-layer DVD (DVDDL) (616), the microcomputer terminates the disc discrimination processing (612).

Then, the microcomputer judges the magnitude of the reflectance of the target disc based on the PE1 (618) and discriminates between DVDs (DVDROM, DVDR) having a large reflectance (622) and DVDs (DVDRW, DVDRAM) having a small reflectance (620).

Meanwhile, the microcomputer judges a CDRW and others based on the above-described FE2 and PE2 (624) and then judges a CDR and others (626). As a result, the microcomputer sequentially discriminates the CDRW (632), the CDR (634) and the CDROM (628) and terminates the disc discrimination processing (630).

When a DVD surface of a dual disc is placed in the optical disc apparatus, the microcomputer confirms the judgment made in the step 604, denies the judgment made in the step 614 and finally discriminates the dual disc as a certain type of DVD (single-layer).

Meanwhile, when the CD surface of the dual disc is placed in the optical disc apparatus, the microcomputer denies the judgment made in the step 606, distinguishes the CD surface of the dual disc from the recording surface of the ordinary CD, and confirms the judgment made in the step 608 to discriminate that the target disc is the CD surface of the dual disc.

When a label surface of a LabelFlash disc is placed in the optical disc apparatus, the microcomputer denies the judgment made in the step 606 and denies the judgment made in the step 608 to discriminate that the target disc is the label surface of the LabelFlash disc.

Figure 7:
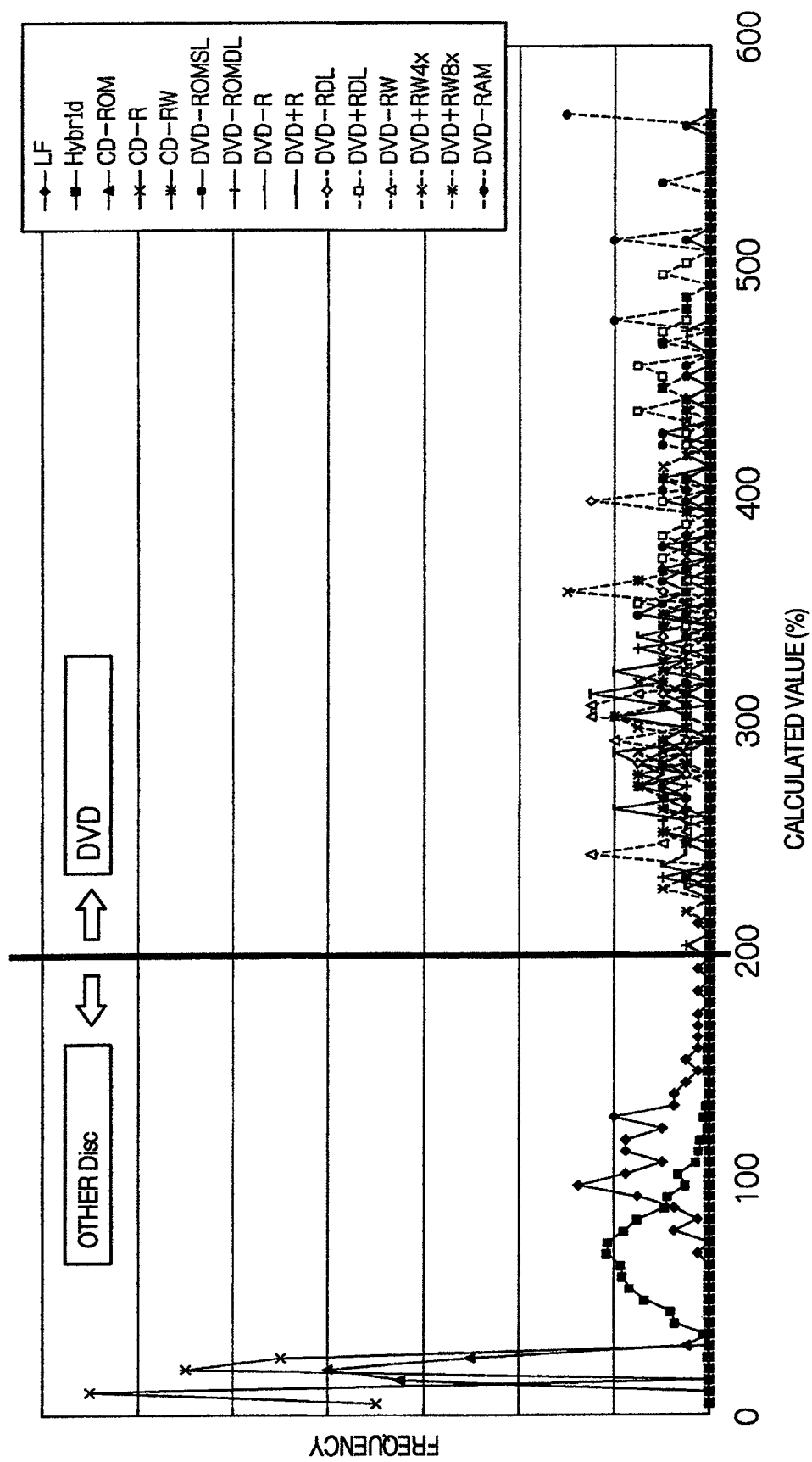
FIG. 7 is a characteristic graph showing a relationship between the actually calculated values (horizontal axis) and the frequency of appearance (%) (vertical axis) of the calculated values obtained by calculating plural times a first index on plural types of discs shown in the drawing.

Then, a finding that leads the inventor to the discovery of the specific threshold values of the above-described indexes is described below. FIG. 7 is a characteristic graph showing a relationship between the actually calculated values (horizontal axis) and the frequency of appearance (%) (vertical axis) of the calculated values obtained by calculating plural times the first indexes of the plural types of discs shown in the drawing.

It is apparent from the graph that when the calculated value is not larger than about 200, no DVD appears. Therefore, when the first index is assumed that 200 is a threshold value (first threshold value), it becomes possible to discriminate whether the target disc is a DVD or another disc. Here, a DVD surface of a dual disc is discriminated as a DVD, and a CD surface of the dual disc is discriminated as a disc other than the DVD.

Figure 8:
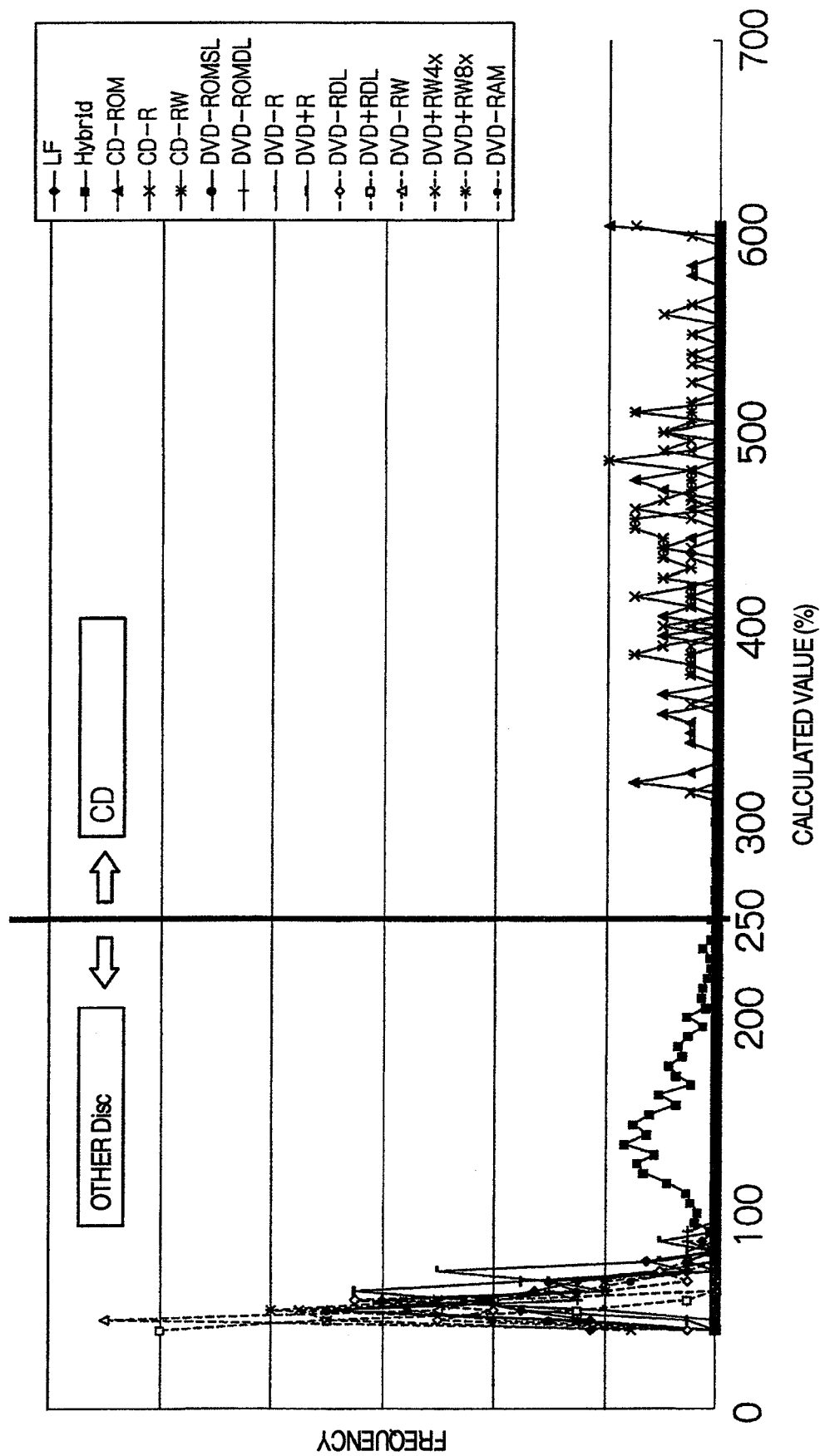
FIG. 8 is a characteristic graph showing a relationship between the actually calculated values (horizontal axis) and the frequency of appearance (%) (vertical axis) of the calculated values obtained by calculating plural times a second index on plural types of discs shown in the drawing.

FIG. 8 is a characteristic graph showing a relationship between the actually calculated values (horizontal axis) and the frequency of appearance (%) (vertical axis) of the calculated values obtained by calculating plural times the second indexes of plural types of discs shown in the drawing.

It is seen from the graph that no CD appears when the calculated value is not larger than about 250. Therefore, when the second index is assumed that 250 is a threshold value (second threshold value), it becomes possible to discriminate whether the target disc is a CD or another disc. Here, a CD surface of a dual disc is discriminated as a disc other than an ordinary CD.

Since the CD layer of the dual disc has a thickness different from that of the ordinary CD, it is considered that a distance from a disc surface to a signal surface is different between them, resulting in having a different spot shape when the incident light hits the disc. Therefore, the calculated value of the second index is different between them. The difference can be grasped as a numeric value according to the above-described characteristic formula to discriminate the recording surface between the CD surface of the dual disc and the ordinary CD.

Figure 9:
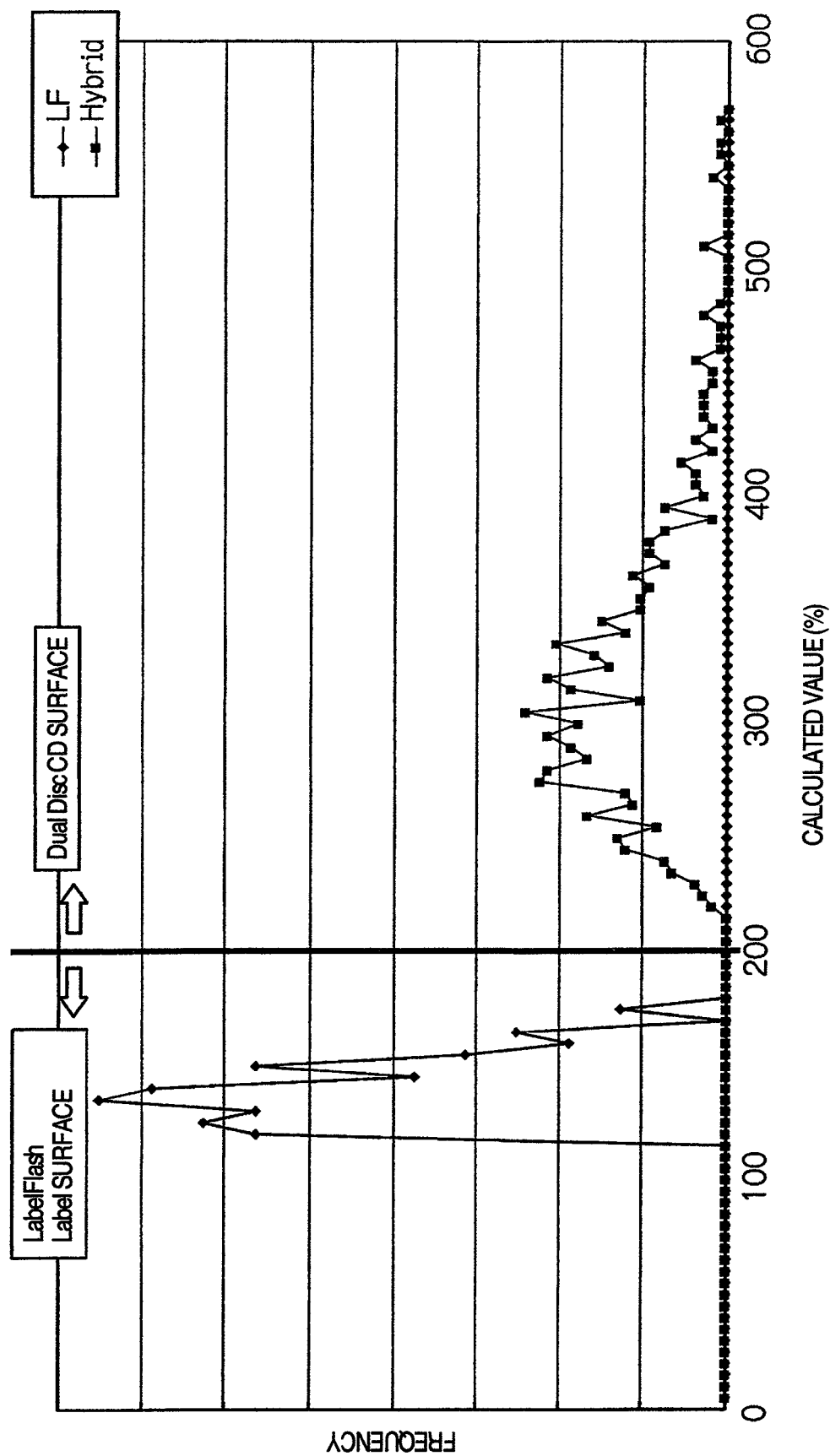
FIG. 9 is a characteristic graph showing a relationship between the actually calculated values (horizontal axis) and the frequency of appearance (%) (vertical axis) of the calculated values obtained by calculating a third index on a LabelFlash disc and a dual disc plural times.

FIG. 9 is a characteristic graph showing a relationship between the actually calculated values (horizontal axis) and the frequency of appearance (%) (vertical axis) of the calculated values by calculating plural times a third index of a LabelFlash disc and a dual disc. It is seen from the graph that only the LabelFlash disc appears when the calculated value is not larger than about 200, and only the dual disc (hybrid disc) appears when the calculated value exceeds it.

Therefore, when the third index is assumed that 200 is a threshold value (third threshold value), it becomes possible to discriminate whether the target disc is a CD surface of the dual disc or a label surface of the LabelFlash disc.

Figure 10:
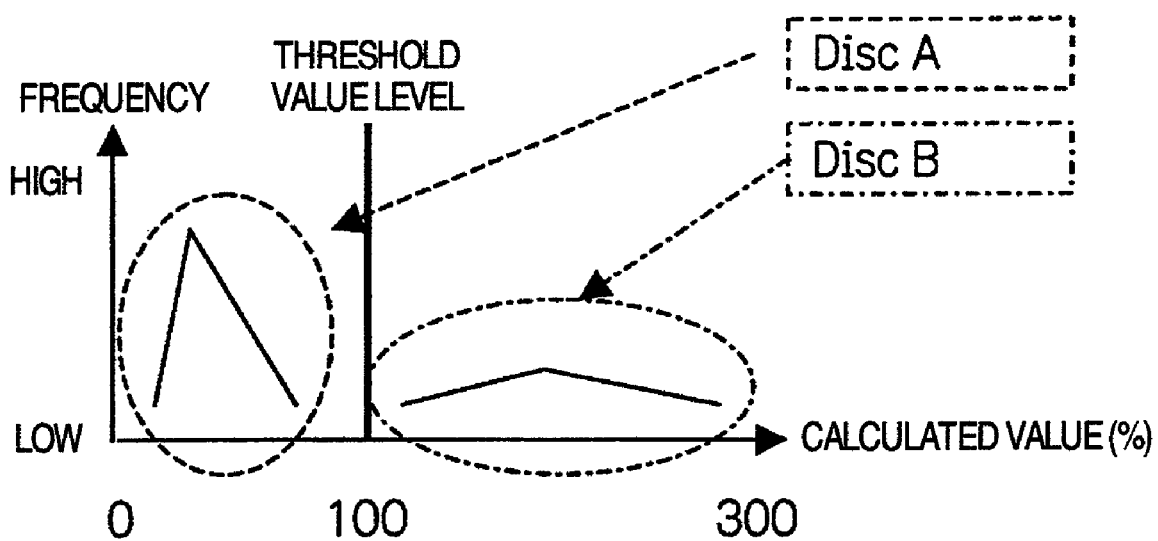
FIG. 10 is a schematic diagram to help understanding FIG. 7 through FIG. 9.

To help understanding FIG. 7 through FIG. 9, the description is supplemented with reference to FIG. 10. FIG. 10 shows that Disc A has a calculated value which is concentrated into a small range of about 0 to 100. Therefore, a frequency indicating a rate of having the calculated value tends to become high.

Meanwhile, Disc B is indicated that the calculated value varies in a large range of about 100 to 300. Therefore, the frequency has a tendency to become low. For disc discrimination, the magnitude of the frequency is not so significant. It is significant that there is a section where the ranges of the Disc A and the Disc B do not overlap and a specific threshold value for discrimination of the disc can be found in it. In FIG. 10, when the specific threshold value is set to 100(%), the Disc A and the Disc B can be distinguished as follows.

When the calculated value is smaller than 100(%), it means Disc A, and when the calculated value is larger than 100(%), it means Disc B.

In case of the dual-layer DVD, the FE signal and the PE signal show an error signal with two peaks (FIG. 5) because two DVD recording layers are formed. For discrimination of the dual-layer DVD, appearance of two signals is detected to discriminate it, and the magnitude of the amplitude does not matter. For discrimination of the magnitude of the reflectance, a signal having larger amplitude is adopted between the two signals. For the amplitude of FIG. 5, one having a larger voltage value is adopted.

The above-described specific threshold value is variable according to a difference in ways of reflection after the incident light hits the disc depending on a difference of the optical pickup structure, the disc structure (pit structure, disc reflectance) and the laser wavelength (two types of laser beam wavelength in the above-described embodiment).

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. An optical disc apparatus to perform reproduction or record reproduction of an optical disc, comprising:
    an optical pickup which irradiates a laser beam onto the optical disc;
    an actuator which moves a light spot of the laser beam in an optical axis direction;
    a photodetector which detects the light reflected from the optical disc at the time of focus control by the actuator; and
    a signal processing circuit which determines an error signal based on an output signal from the photodetector;
    wherein:
    the optical pickup further irradiates laser beams having a different wavelength onto the optical disc;
    the photodetector further detects the reflected lights of the laser beams having the individual wavelengths;
    the signal processing circuit further determines amplitude of the error signal of the each reflected light, calculates an amplitude ratio based on the amplitude of the each reflected light, and discriminates the optical disc based on the amplitude ratio;
    the optical pickup further irradiates a first laser beam having a first wavelength and a second laser beam having a second wavelength onto the optical disc;
    the signal processing circuit further determines amplitude of a focus error signal and amplitude of a pull-in error signal of a first reflected light of the first laser beam, and determines amplitude of a focus error signal and amplitude of a pull-in error signal of a second reflected light of the second laser beam;
    the optical pickup further irradiates a laser beam having a wavelength corresponding to a first standard as a first laser beam to the optical disc and irradiates a laser beam having a wavelength corresponding to a second standard as a second laser beam to the optical disc;
    the first standard is a CD standard, and the second standard is a DVD standard;
    the signal processing circuit further measures:
    amplitude (FE1) of a focus error signal of the reflected light obtained by irradiation of a DVD laser beam to an information recording surface of the optical disc;
    amplitude (PE1) of a pull-in error signal of the reflected light obtained by irradiation of the DVD laser beam to the information recording surface of the optical disc;
    amplitude (FE2) of a focus error signal of the reflected light obtained by irradiation of a CD laser beam to the information recording surface of the optical disc; and
    amplitude (PE2) of a pull-in error signal of the reflected light obtained by irradiation of the CD laser beam to the information recording surface of the optical disc; and
    the signal processing circuit further discriminates a target disc as a CD surface of a dual disc having a CD recording surface and a DVD recording surface when (PE1)/(FE1) is larger than a third specific threshold value and discriminates the target disc as a label surface of a LabelFlash disc when it is equal to or less the third specific threshold value.

2. An optical disc apparatus to perform reproduction or record reproduction of an optical disc, comprising:
    an optical pickup which irradiates a laser beam onto the optical disc;
    an actuator which moves a light spot of the laser beam in an optical axis direction;
    a photodetector which detects the light reflected from the optical disc at the time of focus control by the actuator; and
    a signal processing circuit which determines an error signal based on an output signal from the photodetector;
    wherein:
    the optical pickup further irradiates laser beams having a different wavelength onto the optical disc;
    the photodetector further detects the reflected lights of the laser beams having the individual wavelengths;
    the signal processing circuit further determines amplitude of the error signal of the each reflected light, calculates an amplitude ratio based on the amplitude of the each reflected light, and discriminates the optical disc based on the amplitude ratio; and
    the signal processing circuit further discriminates whether a target disc is a CD surface of a dual disc or a CD depending on a difference in the amplitude ratio which appears on the dual disc having the CD recording surface and a DVD recording surface and the CD.

3. An optical disc apparatus to perform reproduction or record reproduction of an optical disc, comprising:
    an optical pickup which irradiates a laser beam onto the optical disc;
    an actuator which moves a light spot of the laser beam in an optical axis direction;
    a photodetector which detects the light reflected from the optical disc at the time of focus control by the actuator; and
    a signal processing circuit which determines an error signal based on an output signal from the photodetector;
    wherein:
    the optical pickup further irradiates laser beams having a different wavelength onto the optical disc;
    the photodetector further detects the reflected lights of the laser beams having the individual wavelengths;
    the signal processing circuit further determines amplitude of the error signal of the each reflected light, calculates an amplitude ratio based on the amplitude of the each reflected light, and discriminates the optical disc based on the amplitude ratio; and the signal processing circuit further discriminates whether a target disc is a dual disc or a LabelFlash disc depending on a difference in the amplitude ratio which appears on a CD recording surface of the dual disc having a CD recording surface and a DVD recording surface and a label surface of the LabelFlash disc.

* * * * *